US009429191B2

(12) United States Patent
Ertas et al.

(10) Patent No.: US 9,429,191 B2
(45) Date of Patent: Aug. 30, 2016

(54) JOURNAL BEARING ASSEMBLIES AND METHODS OF ASSEMBLING SAME

(71) Applicant: General Electric Company, Schenectady, NY (US)

(72) Inventors: Bugra Han Ertas, Slingerlands, NY (US); Adolfo Delgado Marquez, Niskayuna, NY (US); Darren Lee Hallman, Scotia, NY (US); Walter John Smith, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 131 days.

(21) Appl. No.: 14/052,121

(22) Filed: Oct. 11, 2013

(65) Prior Publication Data
US 2015/0104123 A1    Apr. 16, 2015

(51) Int. Cl.
*F16C 32/06* (2006.01)
*F16C 41/00* (2006.01)
*F16C 43/02* (2006.01)
(Continued)

(52) U.S. Cl.
CPC .......... *F16C 32/0677* (2013.01); *B23P 15/003* (2013.01); *F01D 25/164* (2013.01); *F01D 25/22* (2013.01); *F16C 32/0618* (2013.01); *F16C 32/0622* (2013.01); *F16C 32/0666* (2013.01); *F16C 32/0685* (2013.01); *F16C 43/02* (2013.01); *F16F 15/0237* (2013.01); F16C 27/02 (2013.01); F16C 2360/23 (2013.01); Y10T 29/49639 (2015.01)

(58) Field of Classification Search
CPC ........ F16C 17/03; F16C 17/26; F16C 27/02; F16C 27/045; F16C 32/0618; F16C 32/0622; F16C 32/0685; F16C 32/0677; F16C 32/0666; F16C 43/02; F16C 33/1005; F16C 33/128
USPC .......... 384/99, 117, 119, 130, 215, 308–309, 384/311–312; 417/423.12, 423.14; 408/143; 29/896.93, 898.02
See application file for complete search history.

(56) References Cited

U.S. PATENT DOCUMENTS 3,266,603 A    8/1966  Kamimoto
3,343,833 A    9/1967  Fader
(Continued)

FOREIGN PATENT DOCUMENTS

DE    102010029048 A1 *  11/2011  .............. F16C 32/06
EP    0488715 B1    2/1997
(Continued)

OTHER PUBLICATIONS

International Search Report and Written Opinion issued in connection with corresponding PCT Application No. PCT/US2014/052601 on Jan. 26, 2015.

*Primary Examiner* — Marcus Charles
(74) *Attorney, Agent, or Firm* — Andrew J. Caruso

(57) ABSTRACT

A journal bearing assembly includes a bearing housing, a plurality of bearing pads, and a plurality of bearing pad support assemblies. The bearing housing includes a radial outer wall. The plurality of bearing pads are mounted within the bearing housing, and include at least one of a gas permeable porous media and an array of gas delivery holes. The plurality of bearing pad support assemblies are radially interposed between the bearing pads and the radial outer wall. Each of the bearing pad support assemblies includes a spring assembly and a damper assembly.

16 Claims, 15 Drawing Sheets

(51) Int. Cl.
*B23P 15/00* (2006.01)
*F01D 25/16* (2006.01)
*F01D 25/22* (2006.01)
*F16F 15/023* (2006.01)
*F16C 27/02* (2006.01)

(56) References Cited

U.S. PATENT DOCUMENTS

| | | | |
|---|---|---|---|
| 4,262,975 A | 4/1981 | Heshmat et al. | |
| 4,768,627 A | 9/1988 | Taylor | |
| 4,822,182 A * | 4/1989 | Matsushita et al. | 384/119 |
| 4,826,094 A | 5/1989 | Whiteley | |
| 4,838,710 A * | 6/1989 | Ohta et al. | 384/100 |
| 5,044,781 A | 9/1991 | Werner | |
| 5,088,840 A | 2/1992 | Radtke | |
| 5,145,039 A | 9/1992 | Morikawa et al. | |
| 5,547,287 A * | 8/1996 | Zeidan | 384/311 |
| 5,743,654 A | 4/1998 | Ide et al. | |
| 6,050,727 A * | 4/2000 | Messmer et al. | 384/99 |
| 6,224,533 B1 | 5/2001 | Bengtsson et al. | |
| 6,379,046 B1 | 4/2002 | Zeidan | |
| 6,527,446 B2 | 3/2003 | Lee et al. | |
| 6,566,774 B2 * | 5/2003 | Parmeter et al. | 310/90 |
| 6,695,478 B2 | 2/2004 | Bos et al. | |
| 6,747,378 B2 | 6/2004 | Brackett | |
| 7,023,952 B2 * | 4/2006 | Brunnett | 378/15 |
| 7,648,278 B2 | 1/2010 | Stout et al. | |
| 7,780,424 B2 | 8/2010 | Parmeter et al. | |
| 8,083,413 B2 | 12/2011 | Ertas | |
| 8,240,919 B2 * | 8/2012 | Hirata | 384/100 |
| 8,308,364 B2 * | 11/2012 | Tecza et al. | 384/99 |
| 8,366,323 B2 * | 2/2013 | Waki et al. | 384/312 |
| 8,419,283 B2 | 4/2013 | McAuliffe et al. | |
| 2006/0275090 A1 * | 12/2006 | Onozuka | B32B 29/022 408/143 |

FOREIGN PATENT DOCUMENTS

| | | | | |
|---|---|---|---|---|
| GB | 1012839 A | | 12/1965 | |
| JP | 03024319 A | * | 2/1991 | F16C 32/06 |
| JP | 06213236 A | * | 8/1994 | F16C 32/06 |
| JP | 2948715 B2 | * | 9/1999 | H01H 13/06 |
| JP | 2005214290 A | * | 8/2005 | F16C 32/06 |
| JP | 2006250318 A | * | 9/2006 | F16C 32/06 |
| JP | 2009222086 A | * | 10/2009 | F16C 13/12 |
| JP | 2012149694 A | * | 8/2012 | F16C 17/03 |
| WO | 2011080047 A2 | | 7/2011 | |
| WO | WO 2011149230 A2 | * | 12/2011 | D06F 37/22 |

* cited by examiner

JOURNAL BEARING ASSEMBLIES AND METHODS OF ASSEMBLING SAME

BACKGROUND

The field of the disclosure relates generally to bearing assemblies, and more particularly, to journal bearing assemblies having flexibly mounted gas diffusing bearing pads.

At least some known turbomachines include rotor assemblies that include shafts, compressor impellers, turbines, couplings, sealing packs, and other elements required for optimal operation under given operating conditions. These rotor assemblies have a mass generating a constant static force due to gravity, and also generate a dynamic force due to imbalances in the rotor assembly during operation. Other static forces can be generated from geared turbomachinery. Such turbomachines include bearings to sustain and support these forces while permitting rotation of the rotor assembly.

At least some known turbomachines use oil lubricated bearings to support a rotor assembly while permitting rotation of the rotor assembly. Such oil lubricated bearings are particularly used in high performance turbomachinery, i.e., turbomachines capable of producing greater than 500 kilowatts (KW) of energy, where the mass of the rotor assembly and imbalance loading require significant vibration damping in addition to a significant static load carrying capacity of the bearing.

However, in certain turbomachinery applications, it is desirable to use non-oil lubricated bearings, such as sub-sea compression systems, highly corrosive working fluid environments, cryogenic environments, and high temperature applications. In such applications, at least some known turbomachines use magnetic bearing systems in lieu of an oil lubricated bearing. However, such magnetic bearing systems are relatively costly, require supplemental electronics systems for operation, and are highly complex in operation and setup.

As a result, at least some known rotary machines use gas bearings instead of magnetic bearings where a non-oil lubricated bearing is desired. However, the size of such rotary machines is limited by the ability of the gas bearings to support the weight of the rotor assemblies in such rotary machines and sustain dynamic loading of the rotary machines. The largest known commercially available rotary machines operating on gas bearings are microturbine generators with a power capability of 200 KW. Such microturbine generators include foil bearings, which generate a thin gas film between the bearing and the shaft of the rotor assembly through rotation of the rotor assembly. Such foil bearings, however, are limited in use to small-scale rotary machines because the hydrodynamic effects of using a thin gas film typically do not generate sufficient pressures to support heavier loads. Further, such foil bearings do not have sufficient damping capacity to accommodate rotor assemblies having larger masses used in higher power output machines.

Additionally, gas bearings are not easily adaptable for use in full-scale oil-free turbomachinery applications because of the damping capacity needed to sustain the dynamic loading experienced during operation of such full-scale turbomachinery. Rather, to meet the dynamic loading requirements of full-scale turbomachinery, at least some known rotary machines include squeeze-film dampers. At least some known squeeze-film dampers include a stationary journal and a cylindrical housing separated by a small gap of lubricant (typically oil) which generates dynamic pressures and film forces in response to rotor vibration. Such squeeze-film dampers typically require a lubricant flow circuit that includes a supply port and exit plenum, or in some cases, sealing assemblies to prevent the lubricant from leaking out of the bearing assembly. However, such squeeze-film dampers are prone to leakage despite the use of lubricant flow circuits and sealing assemblies. Further, such lubricant flow circuits typically require a complex bearing lubrication system for controlling lubricant delivery and scavenge. As a result, squeeze-film dampers having an open flow lubrication circuit cannot be practically integrated or used in combination with gas lubricated bearing systems.

BRIEF DESCRIPTION

In one aspect, a journal bearing assembly is provided. The bearing assembly includes a bearing housing, a plurality of bearing pads, and a plurality of bearing pad support assemblies. The bearing housing includes a radial outer wall. The plurality of bearing pads are mounted within the bearing housing, and include at least one of a gas permeable porous media and an array of gas delivery holes. The plurality of bearing pad support assemblies are radially interposed between the bearing pads and the radial outer wall. Each of the bearing pad support assemblies includes a spring assembly and a damper assembly.

In another aspect, a turbomachine is provided. The turbomachine includes a casing, a rotor assembly, and a journal bearing assembly. The casing defines a process chamber. The rotor assembly includes a rotatable shaft positioned within the chamber. The journal bearing assembly supports the shaft, and includes a bearing housing, a plurality of bearing pads mounted within the bearing housing, and a plurality of bearing pad support assemblies radially interposed between the bearing pads and the bearing housing. The plurality of bearing pads include at least one of a gas permeable porous media and an array of gas delivery holes. At least one of the bearing pad support assemblies includes a hermetically sealed fluid-filled damper assembly. The bearing assembly is configured to receive a process gas from the process chamber and transmit the process gas to the bearing pads to provide lubrication between the shaft and the bearing pads.

In yet another aspect, a method of assembling a journal bearing assembly is provided. The method includes providing a bearing housing including a radial inner wall and a radial outer wall, providing a plurality of bearing pads including at least one of a gas permeable porous media and an array of gas delivery holes, coupling the plurality of bearing pads along the radial inner wall of the bearing housing, providing a plurality of bearing pad support assemblies, each of the bearing pad support assemblies including a spring assembly and a damper assembly, and coupling the damper assemblies within the bearing housing.

DRAWINGS

These and other features, aspects, and advantages of the present disclosure will become better understood when the following detailed description is read with reference to the accompanying drawings in which like characters represent like parts throughout the drawings, wherein.

Figure 1:
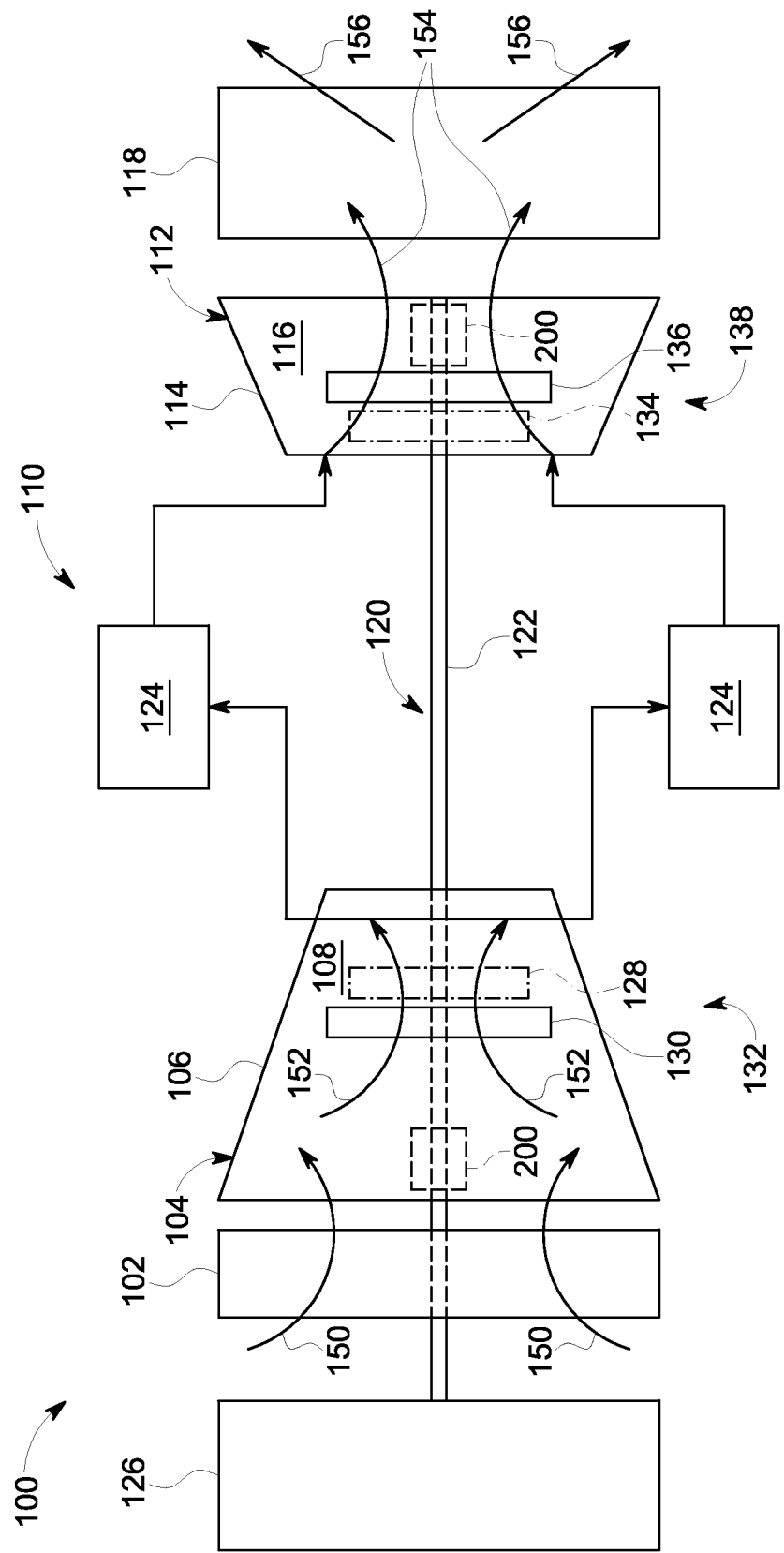
FIG. 1 is a schematic view of a rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Furthermore, references to one "implementation" or one "embodiment" of the subject matter described herein are not intended to be interpreted as excluding the existence of additional implementations that also incorporate the recited features.

The systems and methods described herein provide journal bearing assemblies suitable for use in full-scale, non-oil lubricated turbomachinery. The embodiments described herein facilitate reducing the rotary-resistance of journal bearing assemblies used to support rotor assemblies in non-oil lubricated turbomachinery, enhancing the wear-resistance of such journal bearing assemblies, enhancing the damping capacity of such journal bearing assemblies, and enhancing the static load capacity of such journal bearing assemblies. More specifically, the systems and methods described herein utilize porous bearing pads and bearing pads having an array of gas delivery holes defined therein, in combination with axially aligned damper assemblies and spring assemblies. Therefore, the journal bearing assemblies described herein use a stiff gas film to support the rotor assembly of a turbomachine, and flexibly mounted bearing pads to sustain the dynamic loading experienced by the bearing assembly during operation of the turbomachine. Further, the systems and methods described herein provide damper assemblies suitable for use in non-oil lubricated bearing assemblies and turbomachinery, as well as other oil-free operating environments. The embodiments described herein facilitate incorporating fluid-based damping assemblies into oil-free environments, and enhancing the damping capacity of such damping assemblies to levels approaching the damping capacities of oil-based squeeze-film dampers. More specifically, the systems and methods described herein utilize a hermetically sealed fluid-filled damper housing having a closed flow circuit, in combination with integrally formed springs. Therefore, the damper assemblies described herein have damping capacities suitable for use in full-scale turbomachines, yet do not require complex flow circuits or sealing assemblies.

FIG. 1 is a schematic view of a rotary machine, i.e., a turbomachine 100, and more specifically, a non-oil lubricated turbine engine. In the exemplary embodiment, the turbine engine is a gas turbine engine. Alternatively, turbomachine 100 is any other turbine engine and/or turbomachine, including, without limitation, a steam turbine engine, a centrifugal compressor, and a turbocharger. In the exemplary embodiment, turbomachine 100 includes an air intake section 102, and a compressor section 104 that is coupled downstream from, and in flow communication with, intake section 102. Compressor section 104 is enclosed within a compressor casing 106 defining a compressor chamber 108. A combustor section 110 is coupled downstream from, and in flow communication with, compressor section 104, and a turbine section 112 is coupled downstream from, and in flow communication with, combustor section 110. Turbine section 112 is enclosed within a turbine casing 114 defining a turbine chamber 116. An exhaust section 118 is provided downstream from turbine section 112. Moreover, in the exemplary embodiment, turbine section 112 is coupled to compressor section 104 via a rotor assembly 120 including a drive shaft 122. Drive shaft 122 is rotationally supported by journal bearing assemblies 200 located within compressor casing 106 and turbine casing 114.

In the exemplary embodiment, combustor section 110 includes a plurality of combustor assemblies, i.e., combustors 124 that are each coupled in flow communication with compressor section 104. Moreover, in the exemplary embodiment, turbine section 112 and compressor section 104 are rotatably coupled to a load 126 via drive shaft 122. For example, load 126 may include, without limitation, an electrical generator and/or a mechanical drive application, e.g., a pump. Alternatively, turbomachine 100 may be an aircraft engine.

Also, in the exemplary embodiment, compressor section 104 includes at least one compressor blade assembly 128 and at least one adjacent stationary vane assembly 130. Each combination of compressor blade assembly 128 and adjacent stationary vane assembly 130 defines a compressor stage 132. Also, each compressor blade assembly 128 includes a plurality of compressor blades (not shown in FIG. 1) and each stationary vane assembly 130 includes a plurality of compressor vanes (not shown in FIG. 1). Furthermore, each compressor blade assembly 128 is removably coupled to drive shaft 122 and each stationary vane assembly 130 is removably coupled to, and supported by, compressor casing 106.

Further, in the exemplary embodiment, turbine section 112 includes at least one turbine blade assembly 134 and at least one adjacent stationary nozzle assembly 136. Each combination of turbine blade assembly 134 and adjacent stationary nozzle assembly 136 defines a turbine stage 138. Also, each turbine blade assembly 134 is removably coupled to drive shaft 122 and each stationary nozzle assembly 136 is removably coupled to, and supported by, turbine casing 114.

In operation, air intake section 102 channels air 150 towards compressor section 104. Compressor section 104 compresses inlet air 150 to higher pressures and temperatures prior to discharging compressed air 152 towards combustor section 110. Compressed air 152 is channeled to a fuel nozzle assembly (not shown), mixed with fuel (not shown), and burned within each combustor 124 to generate combustion gases 154 that are channeled downstream towards turbine section 112. Combustion gases 154 generated within combustors 124 are channeled downstream towards turbine section 112. After impinging turbine blade assembly 134, thermal energy is converted to mechanical rotational energy that is used to drive rotor assembly 120. Turbine section 112 drives compressor section 104 and/or load 126 via drive shaft 122, and exhaust gases 156 are discharged through exhaust section 118 to ambient atmosphere. Journal bearing assemblies 200 facilitate rotation of rotor assembly 120 and dampen vibrational energy imparted to bearing assemblies 200 during operation of turbomachine 100. Although bearing assemblies 200 are described and illustrated as being located within compressor casing 106 and turbine casing 114, bearing assemblies 200 may be located at any desired location along shaft 122 including, but not limited to, a central or mid-span region of shaft 122, or other locations along shaft 122 where the use of conventional oil-lubricated bearing assemblies would present significant design challenges. Further, bearing assemblies 200 may be used in combination with conventional oil-lubricated bearing assemblies. For example, in one embodiment, conventional oil-lubricated bearing assemblies may be located at the ends of shaft 122, and one or more bearing assemblies 200 may be located along a central or mid-span region of shaft 122.

Figure 2:
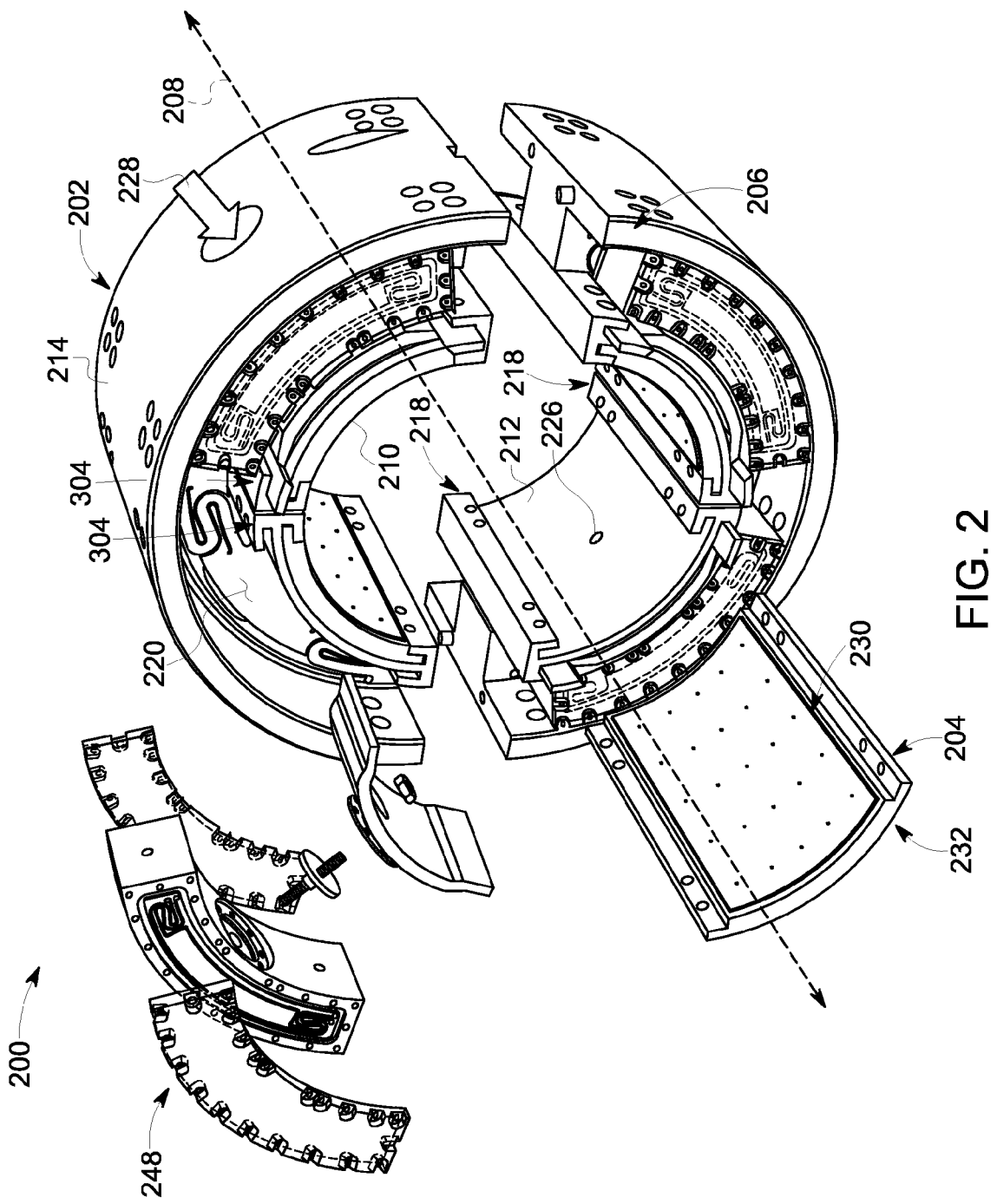
FIG. 2 is a partially exploded view of an exemplary journal bearing assembly of the turbomachine shown in FIG. 1.

FIG. 2 is a partially exploded view of an exemplary journal bearing assembly suitable for use in the turbomachine of FIG. 1. Journal bearing assembly 200 includes a bearing housing 202, a plurality of bearing pad assemblies 204, and a plurality of bearing pad support assemblies 206. Bearing pad assemblies 204 are symmetrically arranged about a centerline 208 of journal bearing assembly 200, and define an annular inner bearing surface 210 configured to support rotatable shaft 122 (shown in FIG. 1). Bearing pad support assemblies 206 are similarly arranged symmetrically about centerline 208, and are disposed radially outwards from a corresponding bearing pad assembly 204. As described below, bearing pad support assemblies 206 provide a flexible mounting support for bearing pad assemblies 204 such that bearing assembly 200 can support relatively large static loads (such as rotor assemblies used in full-scale turbomachinery) while still having sufficient damping capacity to adequately damp the vibrational energy generated during operation of full-scale turbomachinery. For example, journal bearing assembly 200 is suitable for use with a rotor assembly, such as rotor assembly 120, having a mass of at least about 50 pounds, and even at least about 100 pounds. Further, bearing assembly 200 is a non-oil lubricated bearing assembly and, with the exception of the damper assemblies 248 described in more detail below, is an oil-free bearing assembly.

Figure 3:
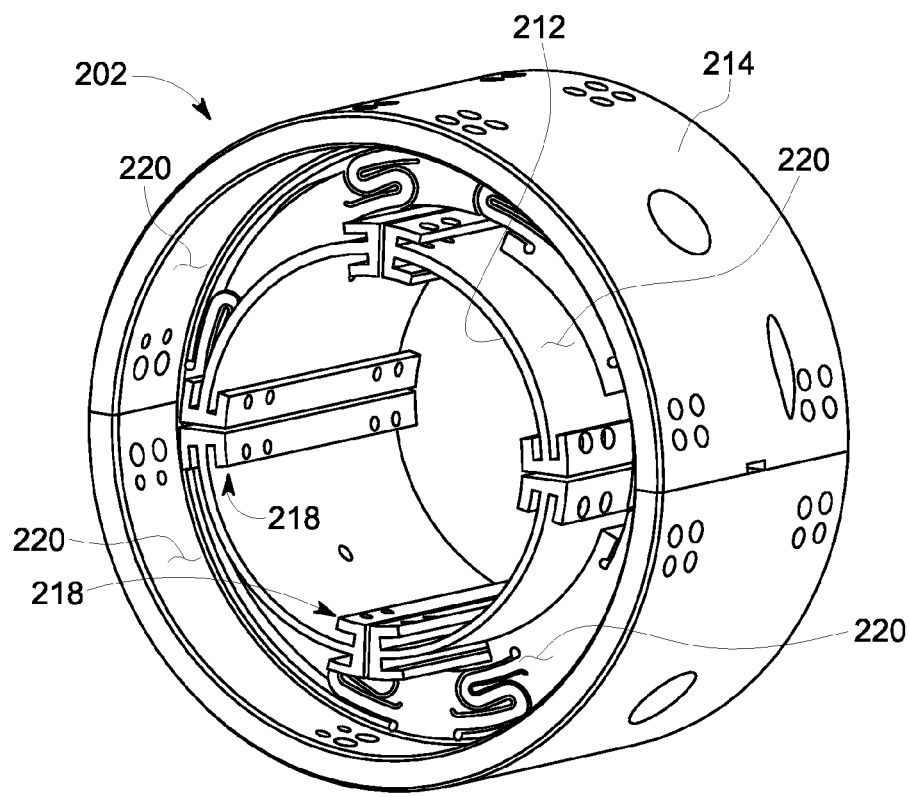
FIG. 3 is a perspective view of an exemplary bearing housing of the journal bearing assembly shown in FIG. 2.
Figure 4:
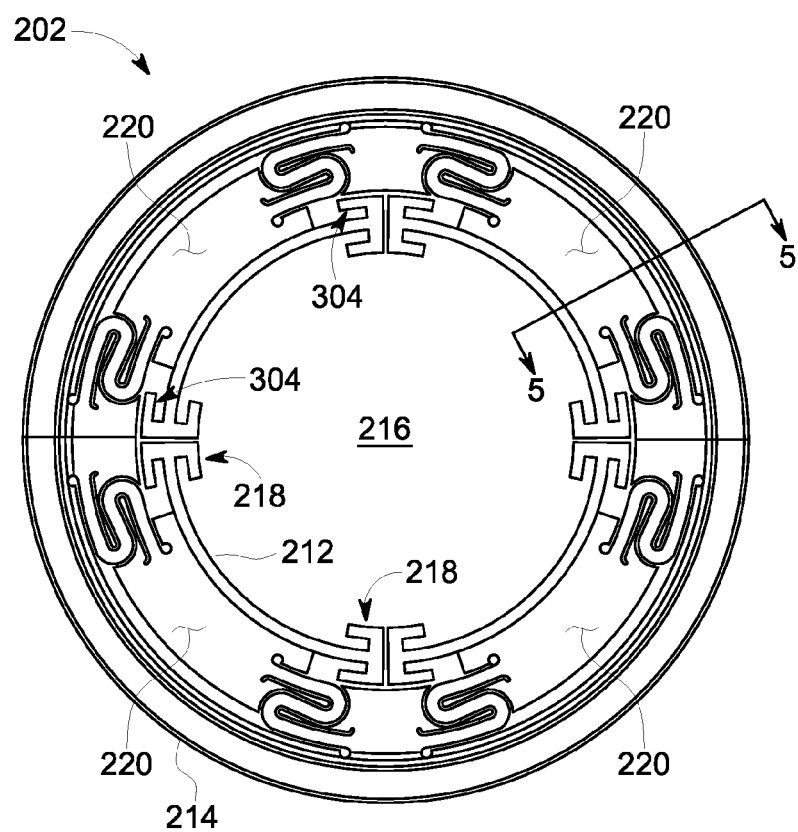
FIG. 4 is an axial view of the bearing housing shown in FIG. 3.

FIG. 3 is a perspective view of bearing housing 202, and FIG. 4 is an axial view of bearing housing 202. Referring to FIGS. 2-4, bearing housing 202 has a generally annular shape and includes a radial inner wall 212 and a radial outer wall 214. Radial inner wall 212 defines an interior cavity 216 in which shaft 122 is received when turbomachine 100 is in an assembled configuration. Bearing pad assemblies 204 are secured within bearing housing 202 adjacent radial inner wall 212 such that shaft 122 is supported by bearing pad assemblies 204 when turbomachine 100 is in an assembled configuration. Bearing pad support assemblies 206 are interposed between radial inner wall 212 and radial outer wall 214 and, more particularly, each bearing pad support assembly 206 is radially aligned with a bearing pad assembly 204 to provide enhanced vibrational damping between shaft 122 and bearing assembly 200. The construction and configuration of bearing pad assemblies 204 and bearing pad support assemblies 206 (described below in more detail) provides suitable stiffness to support large static loads (such as the weight of shafts used in full-scale turbomachinery), provide suitable damping for use in full-scale turbomachinery, yet provides non-oil lubrication between bearing assembly 200 and shaft 122.

Bearing housing 202 is configured to house bearing pad assemblies 204 and bearing pad support assemblies 206. More specifically, bearing housing 202 includes bearing pad rails 218 configured to secure bearing pad assemblies 204 within bearing housing 202, and a plurality of cavities 220 each adapted to receive at least a portion of a bearing pad support assembly 206.

Figure 5:
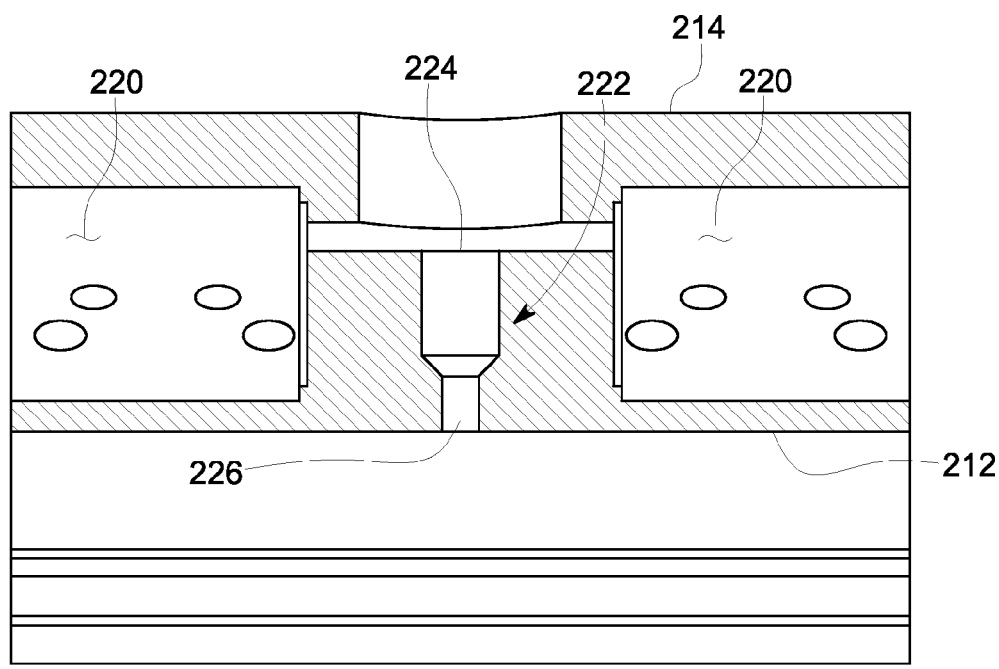
FIG. 5 is a partial cross-sectional view of the bearing housing shown in FIG. 3 taken along line "5-5" shown in FIG. 4.

FIG. 5 is a partial cross-sectional view of bearing housing 202 taken along line "5-5" shown in FIG. 4. Bearing housing 202 includes a plurality of gas delivery ports 222 (broadly, through-holes) extending from a gas inlet 224 defined in radial outer wall 214 to a gas outlet 226 defined in radial inner wall 212. Gas delivery ports 222 are in fluid communication with a pressurized gas source for delivering a pressurized gas 228 (shown in FIG. 2) to interior cavity 216 and, more particularly, to bearing pad assemblies 204. In the exemplary embodiment, gas delivery ports 222 are in fluid communication with at least one of compressor chamber 108 and turbine chamber 116 (broadly, processing chambers), and are adapted to receive a process gas from at least one of processing chambers 108 and 116, and deliver the gas to bearing pad assemblies 204 to provide lubrication between shaft 122 and bearing assembly 200. The process gas 228 delivered to bearing pad assemblies 204 may include, but is not limited to, compressed air 152 and combustion gases 154. In alternative embodiments, gas delivery ports 222 may be coupled in flow communication with an auxiliary gas supply (not shown) for delivering a gas other than a process gas to bearing pad assemblies 204.

In the exemplary embodiment, bearing housing 202 is fabricated from stainless steel, although bearing housing 202 may be fabricated from any suitable material that enables bearing assembly 200 to function as described herein, such as Inconel® and titanium-based alloys.

Figure 6:
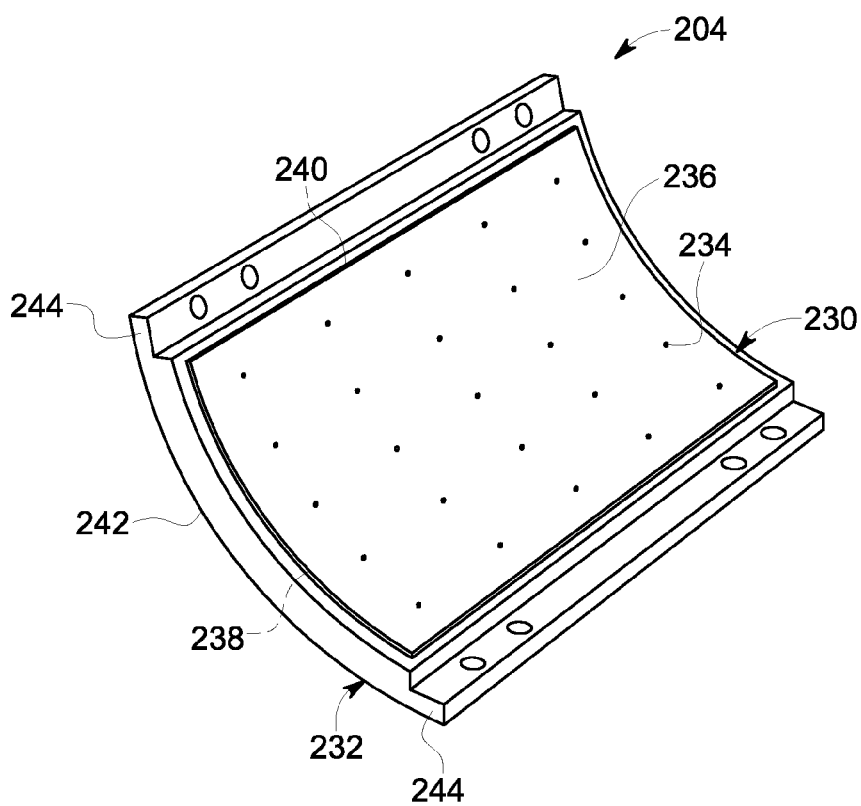
FIG. 6 is a perspective view of an exemplary bearing pad assembly of the bearing assembly shown in FIG. 2.

FIG. 6 is a perspective view of bearing pad assembly 204 shown in FIG. 2. Bearing pad assembly 204 is adapted to receive gas 228 from gas inlet 224, and disperse and/or diffuse gas 228 across bearing pad assembly 204 to provide an evenly distributed pressure field for supporting and/or lubricating shaft 122. In the exemplary embodiment, bearing pad assembly 204 is a modular assembly including a bearing pad 230 detachably connected to a bearing pad retainer 232.

Bearing pad 230 has an arcuate shape generally corresponding to the circular cross-section of shaft 122 and/or the annular shape of bearing housing 202. Bearing pad 230 is fabricated from a porous media and is thus adapted to transmit and diffuse gas 228 received from gas inlet 224 to interior cavity 216. Suitable porous media from which bearing pad 230 may be fabricated include porous carbons, such as carbon graphite, sintered porous ceramics, and sintered porous metals, such as Inconel® and stainless steel. Bearing pad 230 has a sufficiently high gas permeability to permit gas 228 received through gas delivery ports 222 to generate sufficient pressure within interior cavity 216 to support and/or lubricate shaft 122 during operation of turbomachine 100. Furthermore, bearing pad 230 has a sufficiently low porosity to prevent instabilities in the thin gas film created between bearing pads 230 and shaft 122 during operation of turbomachine 100. In the exemplary embodiment, bearing pad 230 is fabricated from porous carbon graphite and thus has superior wear resistance and lubricity characteristics as compared to other known materials from which bearing pad 230 may be fabricated.

In the exemplary embodiment, bearing pad 230 also includes an array of discrete micro-sized gas delivery holes 234 extending from a radial inner surface 236 of bearing pad 230 to a radial outer surface 238 of bearing pad 230. Holes 234 are in fluid communication with gas delivery port 222, and are configured to further diffuse and/or disperse gas 228 across radial inner surface 236 of bearing pad 230 and provide an even pressure field to support and/or lubricate shaft 122 during operation of turbomachine 100. Holes 234 extend in a substantially radial direction from radial inner surface 236 to radial outer surface 238, although in alternative embodiments, holes 234 may extend in a direction other than a substantially radial direction. In the exemplary embodiment, holes 234 have a diameter in the range of between about 2 mils (about 50 micrometers) and about 100 mils (about 2,540 micrometers) and, more specifically, between about 5 mils (about 127 micrometers) and about 20 mils (about 508 micrometers). However, holes 234 may have any suitable diameter that enables bearing assembly 200 to function as described herein. Also in the exemplary embodiment, holes 234 are arranged in a square array, although holes 234 may be arranged in any suitable array, pattern, or configuration that enables bearing assembly 200 to function as described herein.

Bearing pad retainer 232 includes a cavity 240 for receiving and removably securing bearing pad 230 within bearing pad assembly 204, and a gas delivery port (not shown) extending from cavity 240 to a radial outer wall 242 of bearing pad retainer 232. The gas delivery port in bearing pad retainer 232 is aligned with a corresponding gas delivery port 222 to provide flow communication for gas 228 from radial outer wall 214 of bearing housing 202 to bearing pad 230. Moreover, the gas delivery port in bearing pad retainer 232 may be about the same size as or smaller than cavity 240 in bearing pad retainer 232. Bearing pad retainer 232 also includes lips 244 adapted to be slidably received by bearing pad rails 218 (shown in FIGS. 2-4) and thereby secure bearing pad assembly 204 within bearing assembly 200. Bearing pad retainer 232 enables bearing pad 230 to be interchanged with other bearing pads such that bearing pads having different properties (e.g., without limitation, gas permeability and porosity) may be selected based on particular operating conditions and/or particular turbomachines.

Figure 7:
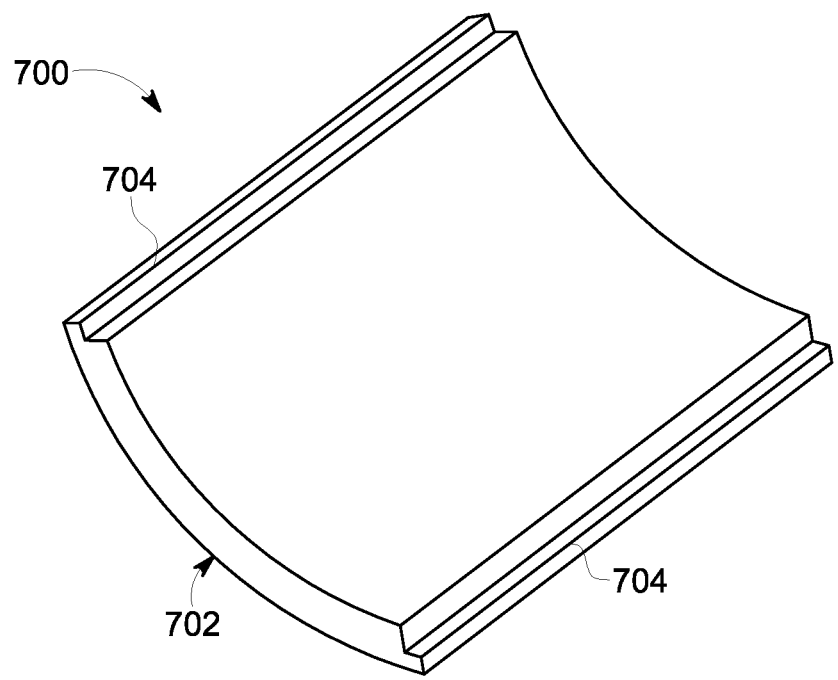
FIG. 7 is a perspective view of an alternative bearing pad assembly suitable for use with the bearing assembly shown in FIG. 2.

FIG. 7 is a perspective view of an alternative bearing pad assembly 700 suitable for use with bearing assembly 200 (shown in FIG. 2). Bearing pad assembly 700 includes a bearing pad 702 adapted to be received directly by bearing pad rails 218. More specifically, bearing pad 702 includes lips 704 adapted to be slidably received by bearing pad rails 218. As such, bearing pad retainer 232 (shown in FIG. 6) is omitted from bearing pad assembly 700. In the exemplary embodiment, bearing pad 702 is fabricated from a porous media and does not include holes 234 (shown in FIG. 6). In further alternative embodiments, bearing pads 230 and 702 may include holes 234 and may be fabricated from a non-porous media such that holes 234 are substantially the only source of transmission and diffusion of gas 228 through bearing pads 230 and 702 to interior cavity 216.

Bearing pads 230 and 702 may be fabricated by any suitable method that enables bearing assembly 200 to function as described herein. In one particular embodiment, bearing pads 230 and 702 are fabricated using an additive manufacturing process (also known as rapid prototyping, rapid manufacturing, and 3D printing) such as selective laser sintering (SLS), direct metal laser sintering (DMLS), electron beam melting (EBM), or selective heat sintering (SHS). Fabricating bearing pads 230 and 702 using an additive manufacturing process permits precise control of the porosity and gas permeability of bearing pads 230 and 702, and the size of holes 234.

Further, in alternative embodiments, bearing pads 230 and 702 may be integrally formed within bearing housing 202 using, for example, an additive manufacturing process or an electric discharge machining (EDM) process.

Referring again to FIG. 2, the exemplary embodiment includes four bearing pad assemblies 204 symmetrically located about centerline 208. It is noted that alternative embodiments may include any suitable number of bearing pad assemblies 204 that enable bearing assembly to function as described herein.

Figure 8:
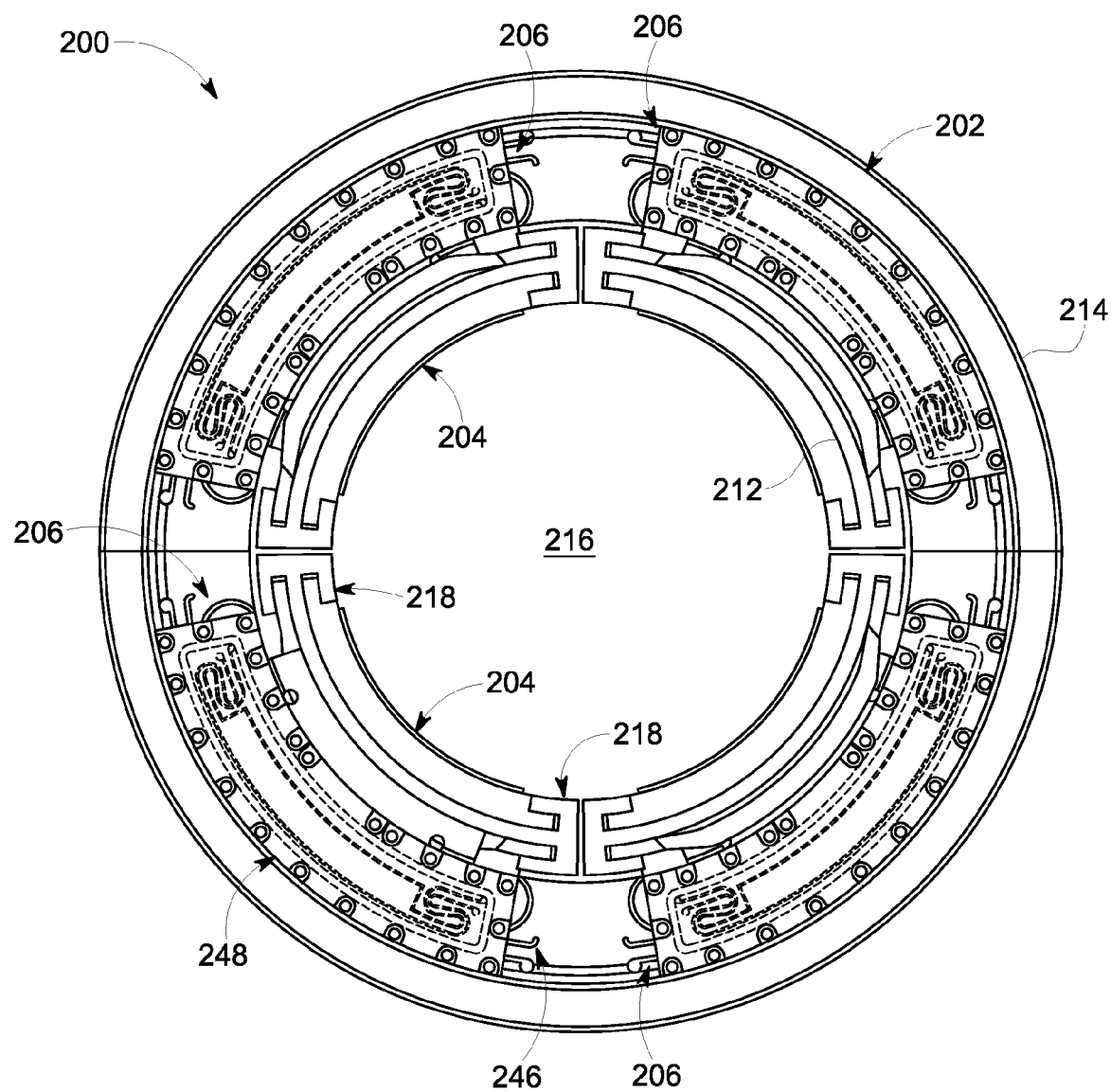
FIG. 8 is an axial view of the bearing assembly shown in FIG. 2 in an assembled configuration.

FIG. 8 is an axial view of bearing assembly 200 shown in FIG. 2 in an assembled configuration. The exemplary embodiment includes four bearing pad support assemblies 206 corresponding to the four bearing pad assemblies 204. Alternatively, journal bearing assembly 200 may include any suitable number of bearing pad support assemblies 206 that enable bearing assembly 200 to function as described herein.

Each bearing pad support assembly 206 is radially aligned with a bearing pad assembly 204 such that loads imparted on bearing pad assemblies 204 by shaft 122 are transmitted to a corresponding bearing pad support assembly 206. Each bearing pad support assembly 206 includes a spring assembly 246 and a damper assembly 248 axially aligned with spring assembly 246. Spring assemblies 246 are configured to provide sufficient stiffness to support large static loads (such as the weight of shafts used in full-size turbomachinery), while damper assemblies 248 are configured to provide sufficient damping to dampen the vibrational loads transmitted to bearing assembly 200 by shaft 122 during operation of turbomachine 100.

Figure 9:
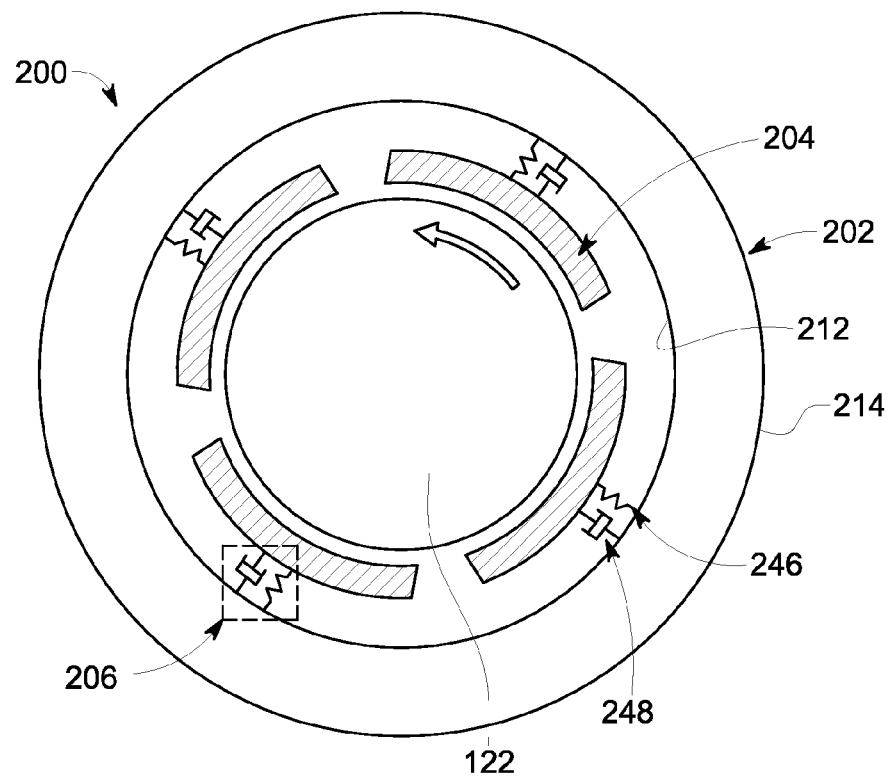
FIG. 9 is a schematic diagram of the bearing assembly shown in FIG. 8.

FIG. 9 is a schematic diagram of bearing assembly 200 shown in FIG. 8. FIG. 9 illustrates the stiffness and damping elements provided by spring assemblies 246 and damper assemblies 248, respectively.

Figure 10:
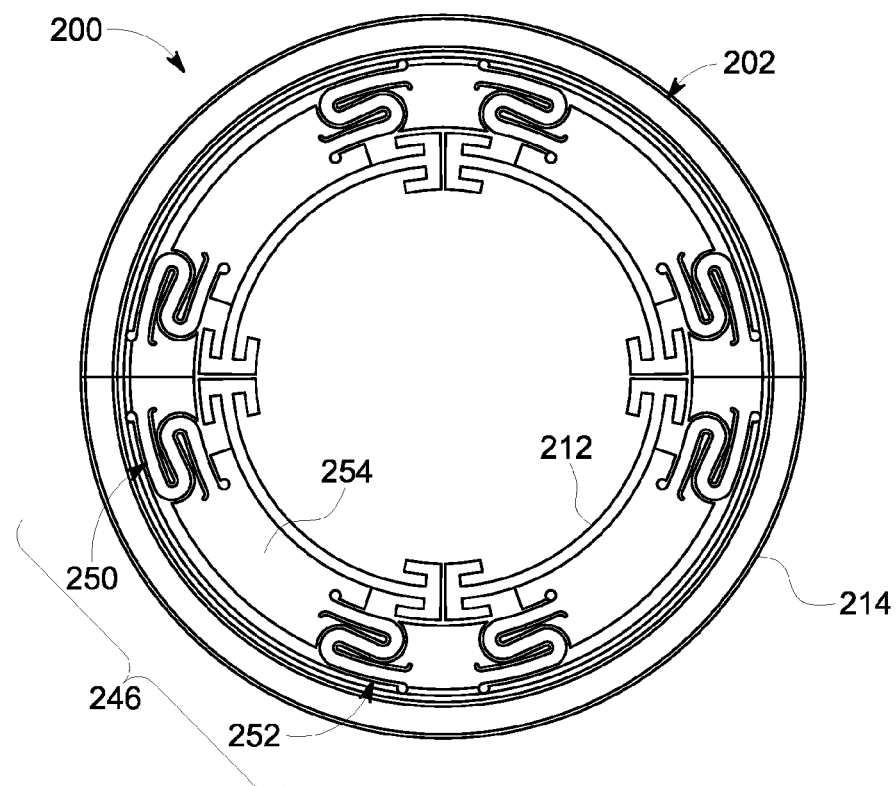
FIG. 10 is a cross-sectional view of the bearing assembly shown in FIG. 8 with damper assemblies omitted for clarity.

FIG. 10 is a cross-sectional view of bearing assembly 200 shown in FIG. 8 with damper assemblies 248 (shown in FIGS. 2 and 8) omitted for clarity. As shown in FIG. 10, each spring assembly 246 includes a pair of springs 250 and 252 having an "S"-shaped cross-section adapted to provide a linear elastic response to loads transmitted by shaft 122 to bearing assembly 200. Springs 250 and 252 thereby provide a stiffness element to bearing pad support assemblies 206. In the exemplary embodiment, springs 250 and 252 are integrally formed within bearing housing 202 using an electric discharge machining (EDM) process, although springs 250 and 252 may be formed using any suitable process that enables bearing assembly 200 to function as described herein.

Springs 250 and 252 extend between radial outer wall 214 and radial inner wall 212 and are coupled to radial inner wall 212, either directly or indirectly, such that loads imparted on bearing pad assemblies 204 are transmitted to springs 250 and 252. Springs 250 and 252 are connected to one another by a bridge 254 extending circumferentially around radial inner wall 212 between springs 250 and 252. Bridges 254 are configured to distribute loads imparted on bearing pad assemblies 204 by shaft 122 between springs 250 and 252.

In the exemplary embodiment, each spring assembly 246 includes two springs 250 and 252, although spring assemblies 246 may include any suitable number of springs that enable spring assemblies 246 to function as described herein. Also in the exemplary embodiment, spring assemblies 246 are integrally formed within bearing housing 202, although spring assemblies 246 may be fabricated separately from bearing housing 202, and be adapted to be received within bearing housing 202.

Referring again to FIG. 8, each bearing pad support assembly 206 includes two damper assemblies 248 axially aligned on opposite sides of a corresponding spring assembly 246. Only one of the two axially aligned damper assemblies is visible in FIG. 8. Each damper assembly 248 is generally arcuately shaped, and is adapted to be received within cavity 220 (shown in FIGS. 2-4). Damper assemblies 248 are radially interposed between radial inner wall 212 and radial outer wall 214, and are coupled to radial inner wall 212 such that loads imparted on bearing pad assemblies 204 are transmitted to a corresponding damper assembly 248.

Figure 11:
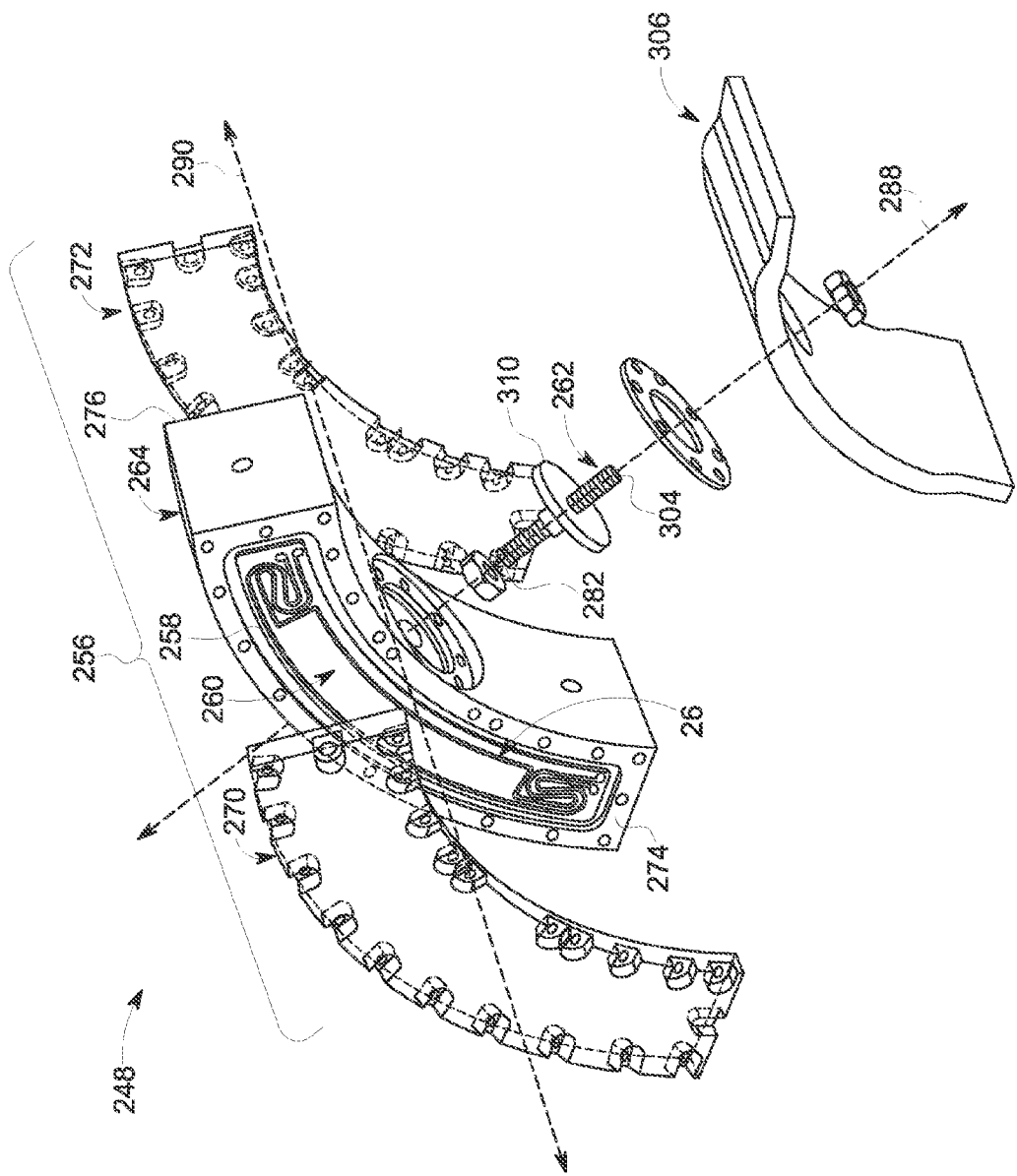
FIG. 11 is an exploded view of an exemplary damper assembly of the bearing assembly shown in FIGS. 2 and 8.

FIG. 11 is an exploded view of damper assembly 248 suitable for use with bearing assembly 200 shown in FIGS. 2 and 8. In the exemplary embodiment, damper assemblies 248 are hermetically sealed fluid-filled dampers. More specifically, each damper assembly 248 includes a sealed damper housing 256 having a non-compressible, viscous fluid 258 disposed therein, a plunger 260, and a rod 262 (broadly, a load transferring member) configured to transmit loads imparted on a bearing pad assembly 204 to a damper assembly 248, specifically, plunger 260.

Damper housing 256 includes a body 264 having a cavity 266 defined therein and a resistive flow path 268 (best seen in FIGS. 12-13) at least partially defined therein, and sealing walls 270 and 272 adapted to be secured to opposing end walls 274 and 276 of body 264 to form a hermetic seal with body 264. Plunger 260 is disposed within cavity 266, and separates cavity 266 into a first control volume 278 and a second control volume 280 (best seen in FIGS. 12 and 13) between which fluid 258 is transferred when plunger 260 is loaded and unloaded. In the exemplary embodiment, plunger 260 is integrally formed within body 264. Plunger 260 is coupled to a first end 282 of rod 262, which projects outward from damper housing 256 and radially inwards towards a corresponding bearing pad assembly 204. The unoccupied volume of cavity 266 and resistive flow path 268 are substantially filled with fluid 258 such that when plunger 260 is loaded and unloaded, fluid 258 is forced through resistive flow path 268, thereby converting vibrational energy imparted on damper assembly 248 into heat, which is subsequently dissipated through conduction and/or convention.

Figure 12:
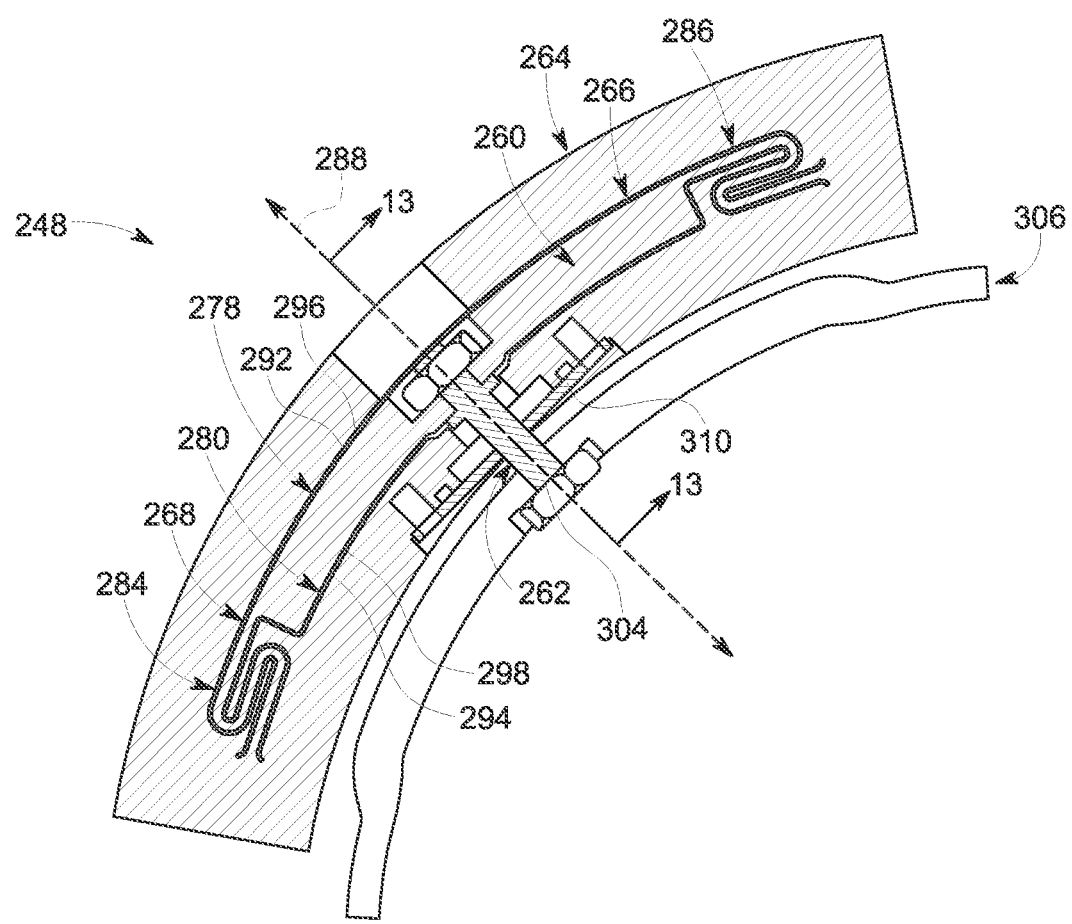
FIG. 12 is a cross-sectional view of the damper assembly shown in FIG. 11 shown in an assembled configuration.

FIG. 12 is a cross-sectional view of damper assembly 248 shown in FIG. 11 in an assembled configuration. Plunger 260 is coupled to damper housing 256 by two integrally formed damper springs 284 and 286 (broadly, restorative-force members), each having an "S"-shaped cross-section. Damper springs 284 and 286 are configured such that damper springs 284 and 286 have a relatively low stiffness in a first or radial direction, indicated by arrow 288, and a relatively high stiffness in a second or axial direction, indicated by arrow 290 (shown in FIG. 11), perpendicular to radial direction 288. Damper springs 284 and 286 thereby permit displacement of plunger 260 in the radial direction 288, yet restrict movement of plunger in the axial direction 290.

Figure 13:
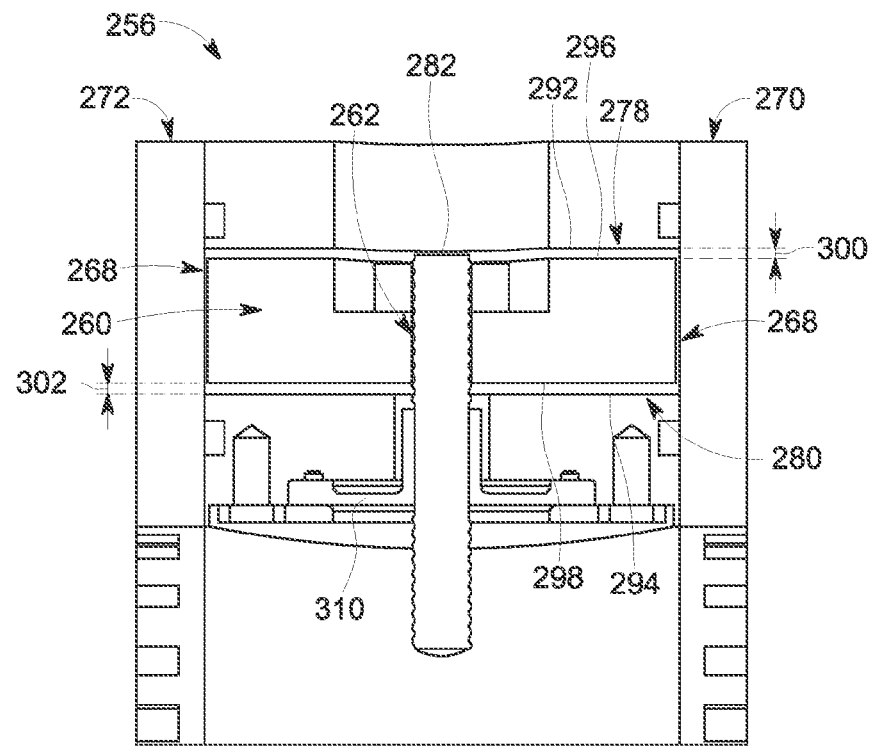
FIG. 13 is a cross-sectional view of the damper assembly shown in FIG. 12 taken along line "13-13" shown in FIG. 12.

FIG. 13 is a cross-sectional view of damper assembly 248 taken along line "13-13" shown in FIG. 12. Restrictive flow path 268 is partially defined between sealing walls 270 and 272, and plunger 260. Restrictive flow path 268 thus forms a continuous loop around plunger 260. Damper springs 284 and 286 facilitate maintaining alignment of plunger 260 within cavity 266, and more specifically, maintaining the distance between sealing walls 270 and 272, and plunger 260. As a result, resistive flow path 268 may have a relatively small cross-sectional area between plunger 260 and sealing walls 270 and 272, thereby increasing the damping effectiveness of damper assembly 248. In addition, damper springs 284 and 286 prevent plunger 260 from becoming locked in place by providing a restorative force to plunger 260 when plunger is loaded and unloaded. Further, because damper springs 284 and 286 are integrally formed with damper housing 256, damper springs 284 and 286 at least partially define resistive flow path 268, thus facilitating a compact construction of damper assembly 248.

Body 264 includes a first, or radial outer wall 292 and a second, or radial inner wall 294 opposite first wall 292. Plunger 260 includes a first, or radial outer surface 296 substantially parallel to first wall 292, and a second, or radial inner surface 298 substantially parallel to second wall 294. First control volume 278 has an effective height 300 measured as the lateral distance between the first wall 292 and the first surface 296. Second control volume 280 similarly has an effective height 302 measured as the lateral distance between second wall 294 and second surface 298. In the exemplary embodiment, effective heights 300 and 302 of the first and second control volumes 278 and 280 are dimensioned such that loading and unloading of plunger 260 creates a squeeze-film effect between fluid 258, first wall 292, first surface 296, second wall 294 and second surface 298, thereby increasing the damping effectiveness of damper assembly 248. More specifically, in the exemplary embodiment, first control volume 278 and second control volume 280 each have an effective height in the range of between about 2 mils (0.002 inches, or about 50 micrometers) and about 150 mils (0.150 inches, or about 3,810 micrometers), and more specifically between about 15 mils (0.015 inches, or about 381 micrometers) and about 30 mils (0.030 inches, or about 762 micrometers).

In the exemplary embodiment, fluid 258 is an oil-based fluid. However, any suitable incompressible fluid may be used as fluid 258 depending on the application and operating environment in which bearing assembly 200 and/or damper assembly 248 are used. For example, in high temperature applications, fluid 258 may be a liquid metal (broadly, a metallic fluid), such as gallium, indium or a gallium and/or indium based alloy.

In the exemplary embodiment, sealing walls 270 and 272 are plates secured to body 264 using fasteners (not shown). Alternatively, sealing walls 270 and 272 have any suitable configuration that enables damper assembly 248 to function as described herein. For example, sealing walls 270 and 272 may be integrally formed with body 264, or sealing walls 270 and 272 may be welded to body 264 using any suitable welding technique to form a hermetic seal between sealing walls 270 and 272, and body 264.

Referring again to FIG. 12, rod 262 is configured to transmit loads imparted on a bearing pad assembly 204 to plunger 260. More specifically, a second end 304 of rod 262 opposite first end 282 is coupled to a damper strut 306. When bearing assembly 200 is in an assembled configuration (shown in FIG. 3), damper strut 306 is interposed between damper assembly 248 and a bearing pad assembly 204 such that loads imparted on bearing pad assembly 204 are transferred to damper strut 306, which in turn transfers the load to plunger 260 via rod 262. Damper strut 306 is shaped complementary to bearing pad assemblies 204, and is thus arcuately shaped. Damper strut 306 is adapted to be slidably received within damper assembly rails 308 (shown in FIGS. 2 and 4), which project radially outwards from radial inner wall 212 of bearing housing 202.

Damper assembly 248 further includes an annular diaphragm 310 surrounding rod 262 and forming a flexible seal on damper housing 256. Diaphragm 310 is configured to permit movement of rod 262 in radial direction 288, while maintaining a hermetic seal on damper housing 256. Diaphragm 310 is secured to body 264 by an annular flange 312. In the exemplary embodiment, diaphragm 310 is integrally formed on rod 262, and is fabricated from titanium. In alternative embodiments, diaphragm may be fabricated from any suitable material that enables damper assembly 248 to function as described herein. In one alternative embodiment, diaphragm 310 is formed from rubber and is attached to rod 262 by vulcanization.

While the damper assemblies of the present disclosure are described with reference to a bearing assembly for use in a turbomachine, the damper assemblies of the present disclosure are suitable for use in a variety of applications other than in bearing assemblies and turbomachines. Accordingly, the damper assemblies of the present disclosure may have any suitable size, shape, and configuration that enables the damper assemblies to function as described herein.

Figure 14:
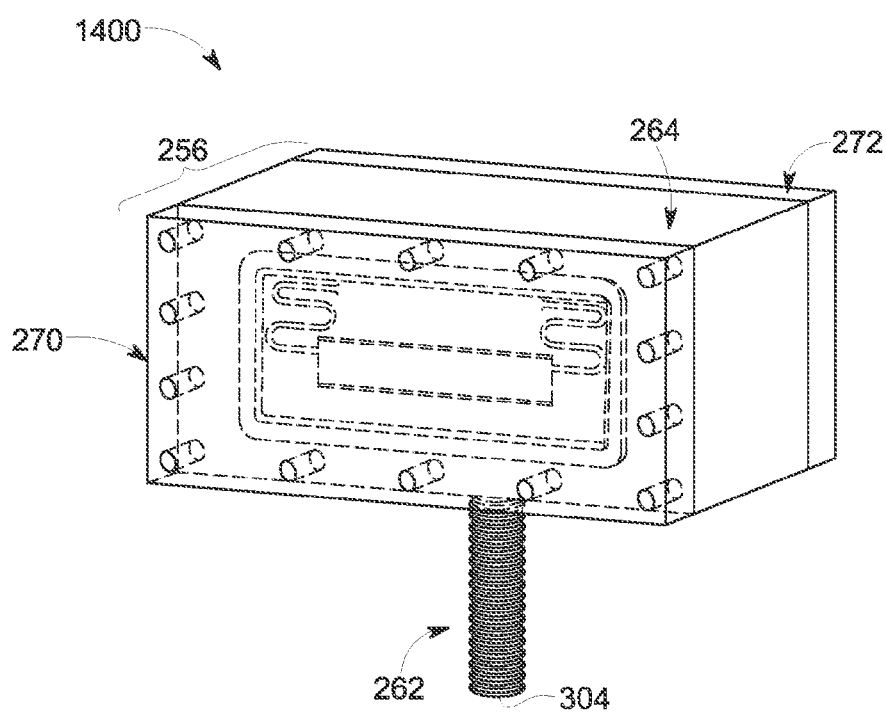
FIG. 14 is a perspective view of an alternative damper assembly.
Figure 15:
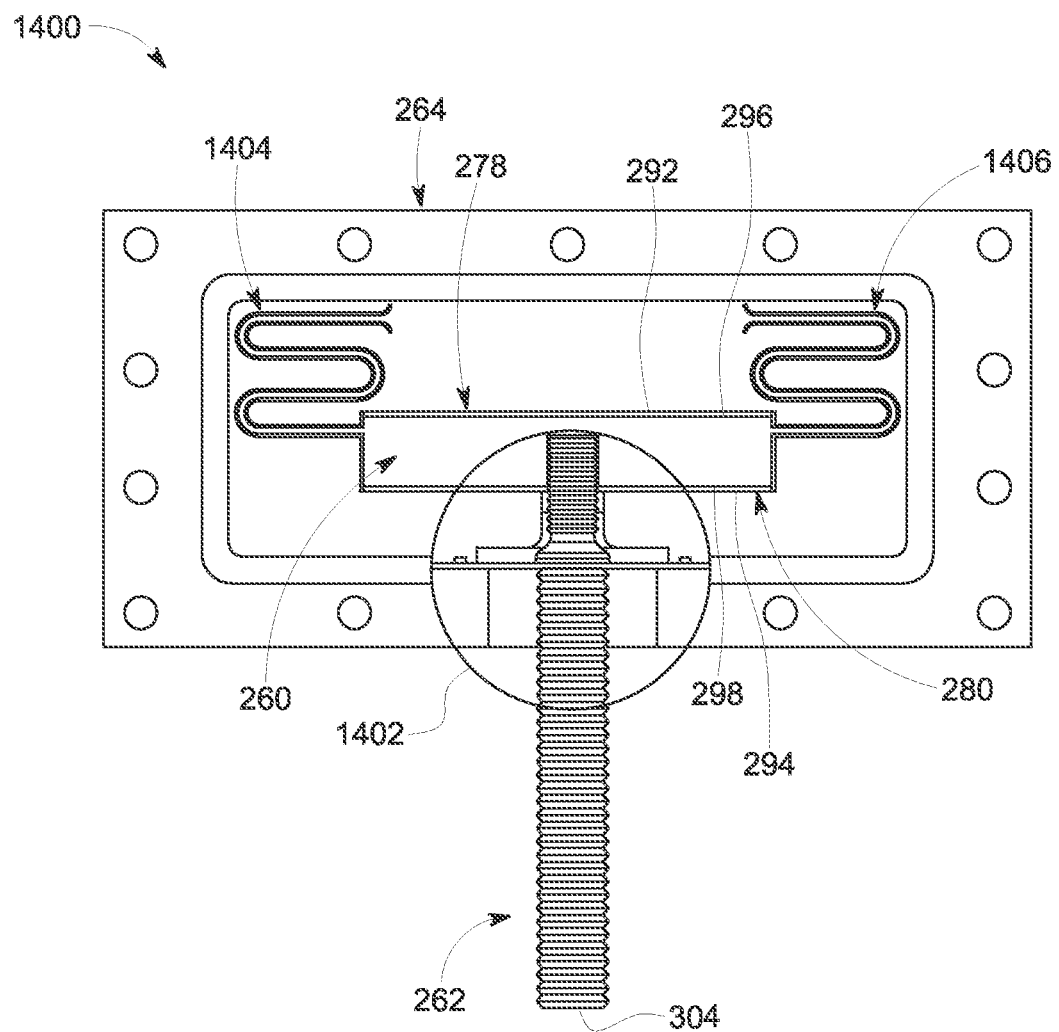
FIG. 15 is an cross-sectional view of the damper assembly shown in FIG. 14.

For example, FIG. 14 is a perspective view of an alternative damper assembly 1400, and FIG. 15 is a cross-sectional view of damper assembly 1400 shown in FIG. 14 with a portion 1402 cut-away for illustration. Damper assembly 1400 is similar to damper assembly 248, except that damper assembly 1400 has a generally rectangular shape, and the damper springs 1404 and 1406 of damper assembly 248 have a different configuration than damper springs 284 and 286 of damper assembly 248.

Figure 16:
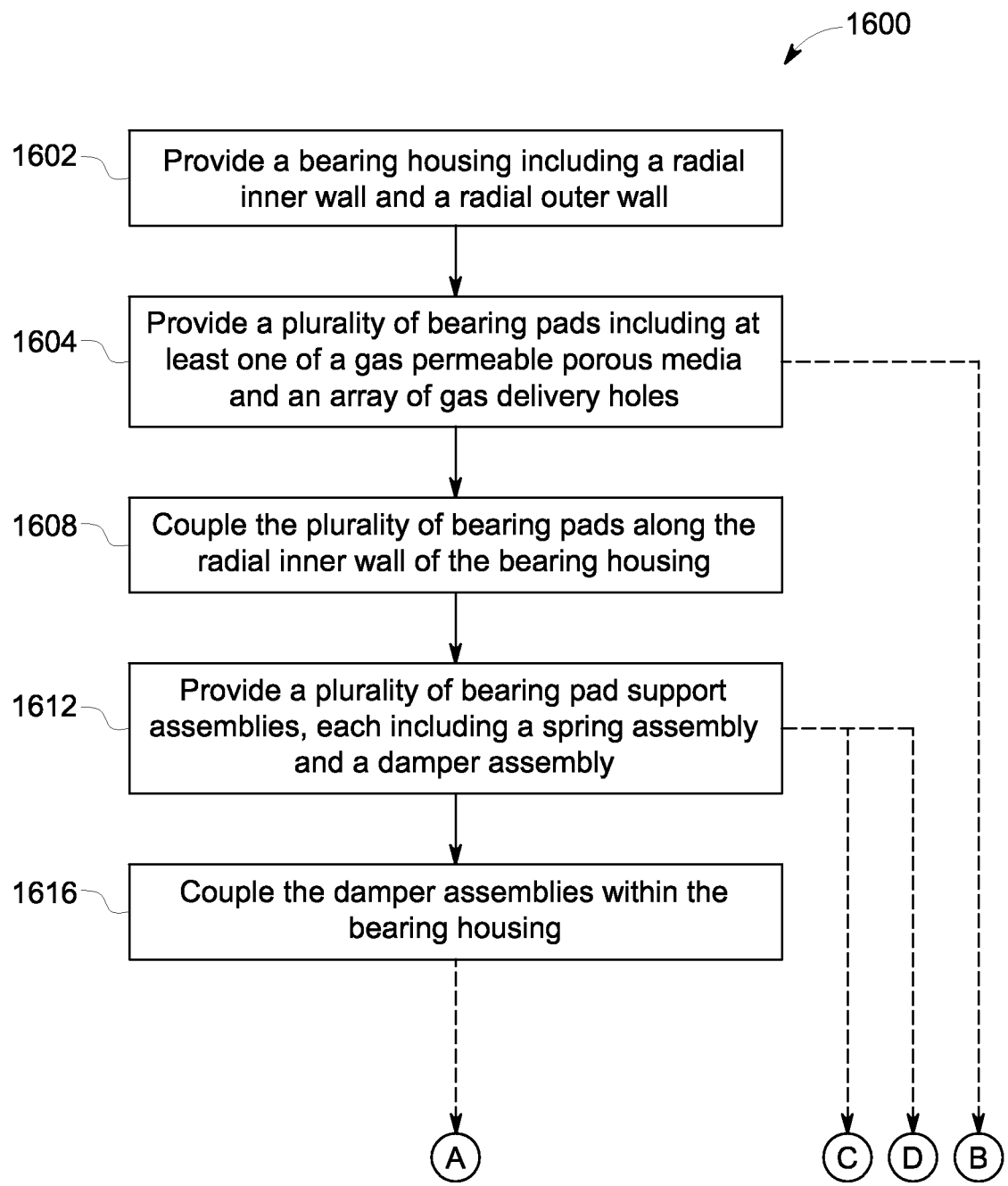
FIG. 16 is a flow chart of an exemplary method of assembling a bearing assembly.
Figure 17:
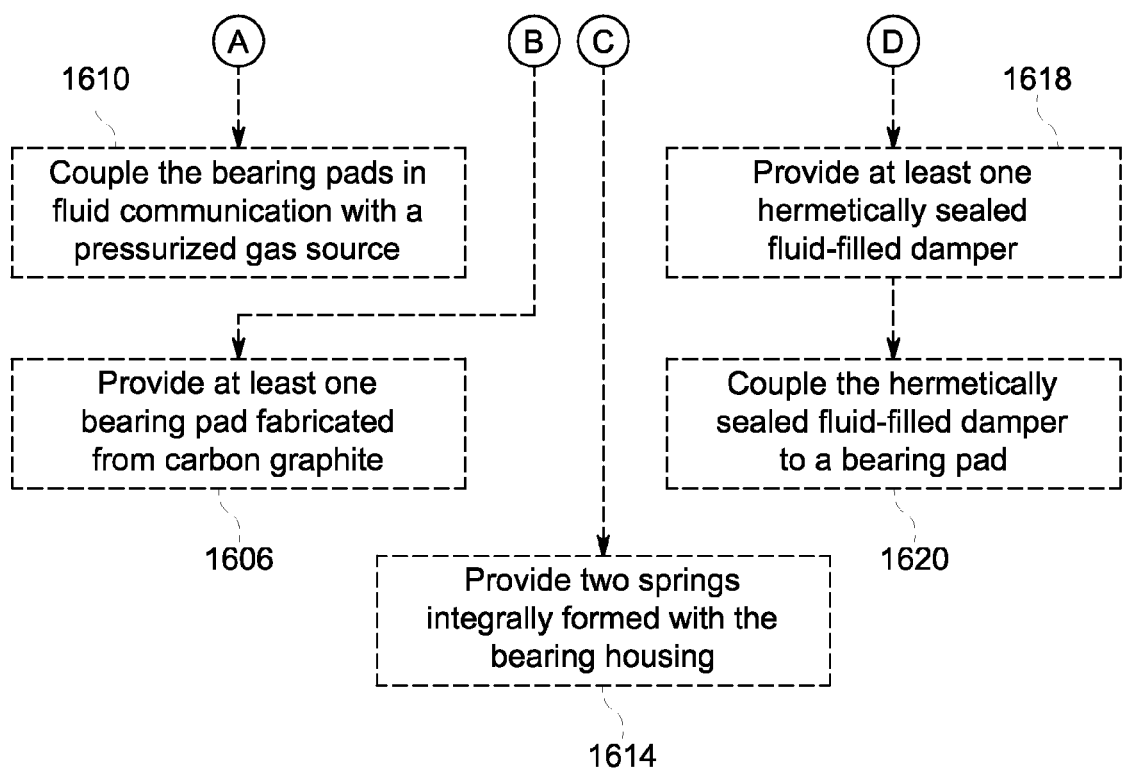
FIG. 17 is a continuation of FIG. 16.

FIG. 16 is a flow chart of an exemplary method 1600 of assembling a bearing assembly, such as bearing assembly 200 (shown in FIG. 2). FIG. 17 is a continuation of FIG. 16.

In the exemplary method, bearing housing 202 (shown in FIG. 2) including a radial inner wall and a radial outer wall is provided 1602. A plurality of bearing pads 230 and/or 702 (shown in FIGS. 6 and 7) including at least one of a gas permeable porous media and an array of gas delivery holes are provided 1604. In some embodiments, a bearing pad fabricated from carbon graphite may be provided 1606 as one of bearing pads 230 and/or 702. The plurality of bearing pads 230 and/or 702 are coupled 1608 along the radial inner wall of bearing housing 202. In some embodiments, bearing pads 230 and/or 702 may be coupled 1610 in fluid communication with a pressurized gas source. A plurality of bearing pad support assemblies 206 (shown in FIG. 2) are provided 1612. Each bearing pad support assembly 206 includes a spring assembly 246 and a damper assembly 248 (shown in FIG. 8). In some embodiments, two springs 250 and 252 (shown in FIG. 10) integrally formed with bearing housing 202 may be provided 1614 as part of spring assembly 246. Springs 250 and 252 may have an "S"-shaped cross-section. Damper assemblies 248 are coupled 1616 within bearing housing 202. In some embodiments, a hermetically sealed fluid-filled damper 248 may be provided 1618 as part of bearing pad support assembly 206. The hermetically sealed fluid-filled damper 248 may be coupled 1620 to bearing pad 230 and/or 702 such that mechanical loads imparted to bearing pad 230 and/or 702 are transmitted to the hermetically sealed fluid-filled damper 248.

Figure 18:
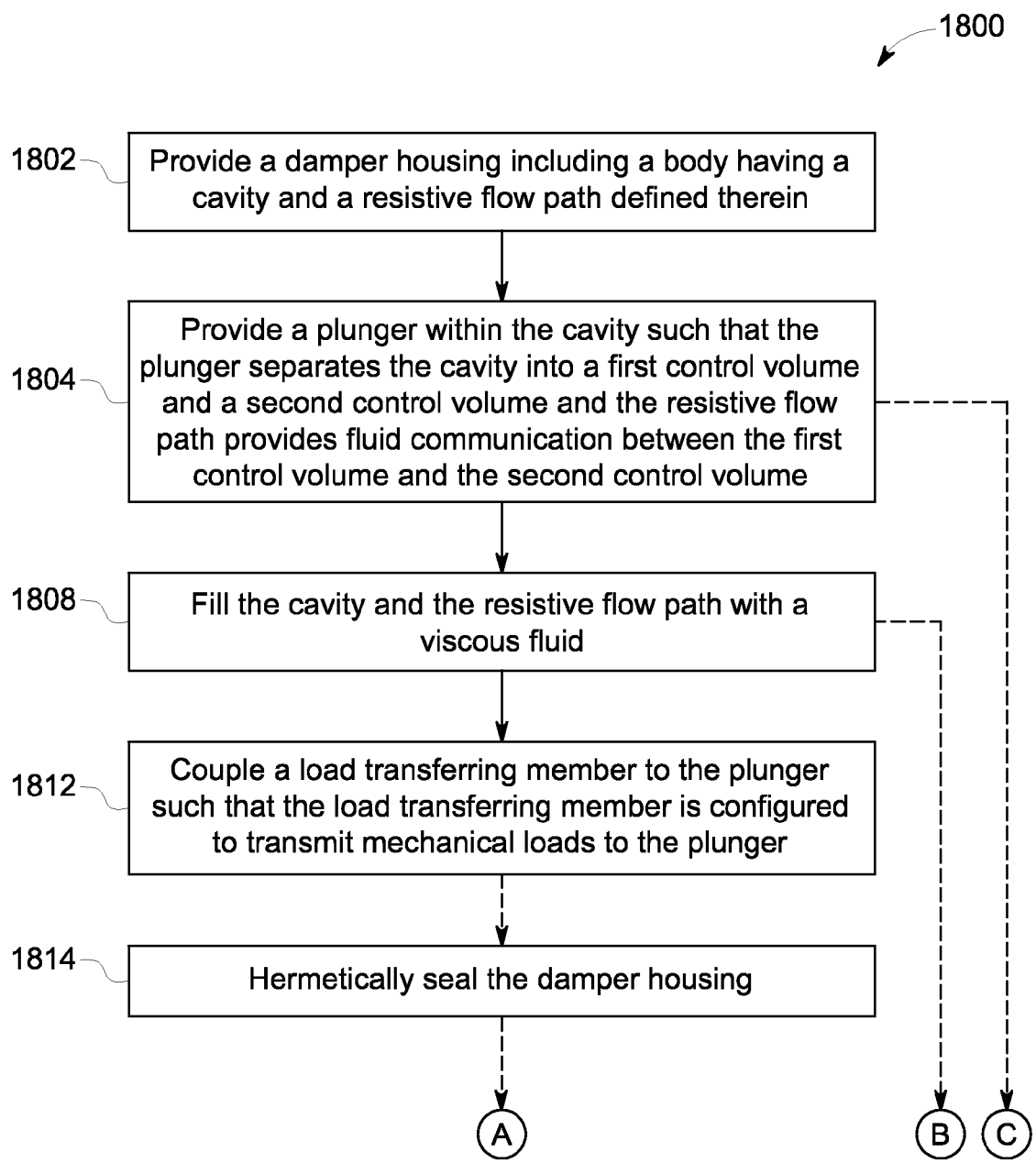
FIG. 18 is a flowchart of an exemplary method of assembling a hermetically sealed damper assembly.
Figure 19:
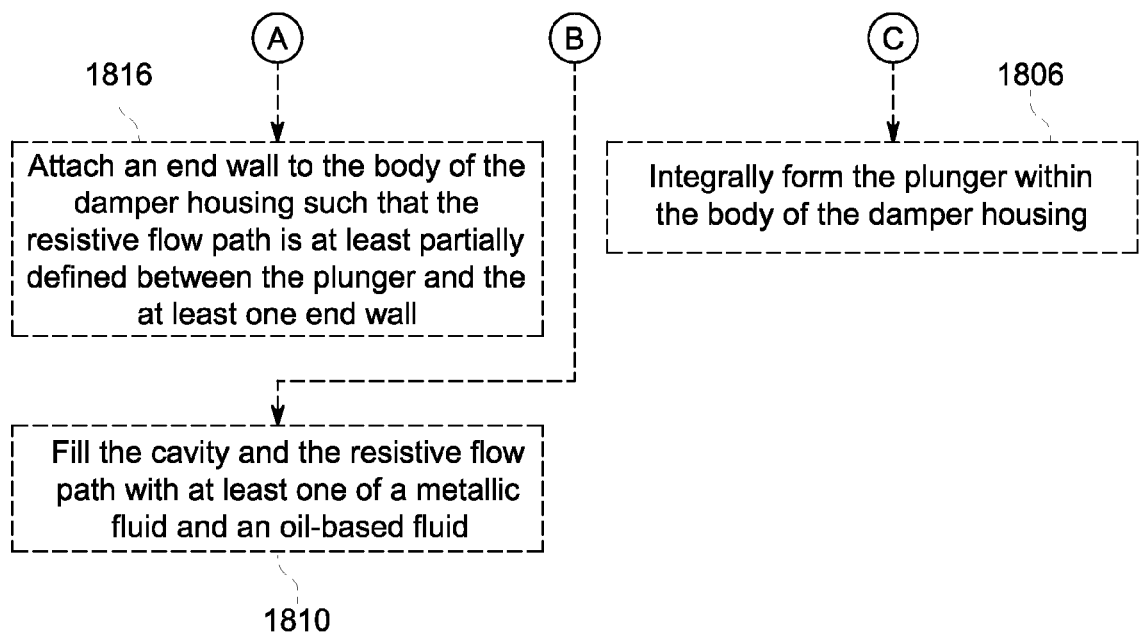
FIG. 19 is a continuation of FIG. 18.

FIG. 18 is a flowchart of an exemplary method 1800 of assembling a hermetically sealed damper assembly, such as damper assembly 248 (shown in FIGS. 11-12). FIG. 19 is a continuation of FIG. 18.

In the exemplary method, a damper housing 256 (shown in FIG. 11) including a body 264 having a cavity 266 and a resistive flow path 268 (shown in FIG. 13) defined therein is provided 1802. Body 264 includes a plurality of springs 284 and 286 (shown in FIG. 12) integrally formed therein. A plunger 260 (shown in FIG. 11) is provided 1804 within cavity 266 such that plunger 260 separates cavity 266 into a first control volume 278 and a second control volume 280 (shown in FIG. 13), and resistive flow path 268 provides fluid communication between first control volume 278 and the second control volume 280. Plunger 260 is attached to springs 284 and 286 such that springs 284 and 286 provide a restorative force to plunger 260. In some embodiments, providing plunger 260 within cavity 266 may include integrally forming 1806 plunger 260 within body 264 of damper housing 256. Cavity 266 and resistive flow path 266 are filled 1808 with a viscous fluid 258. In some embodiments, filling cavity 266 and resistive flow path 268 with a viscous fluid 258 may include filling 1810 cavity 266 and resistive flow path 268 with at least one of a metallic fluid and an oil-based fluid. A load transferring member 262 (shown in FIG. 11) is coupled 1812 to plunger 260 such that load transferring member 262 is configured to transmit mechanical loads to plunger 260. The method 1800 may further include hermetically sealing 1814 damper housing 256. In some embodiments, hermetically sealing 1814 damper housing 256 may include attaching 1816 an end wall 270 (shown in FIG. 11) to the body of damper housing 256 such that resistive flow path 268 is at least partially defined between plunger 260 and end wall 270.

The systems and methods described above provide journal bearing assemblies suitable for use in full-scale, non-oil lubricated turbomachinery. The embodiments described herein facilitate reducing the rotary-resistance of journal bearing assemblies used to support rotor assemblies in non-oil lubricated turbomachinery, enhancing the wear-resistance of such journal bearing assemblies, enhancing the damping capacity of such journal bearing assemblies, and enhancing the static load capacity of such journal bearing assemblies. More specifically, the systems and methods described herein utilize porous bearing pads and bearing pads having an array of gas delivery holes defined therein, in combination with axially aligned damper assemblies and spring assemblies. Therefore, the journal bearing assemblies described herein use a stiff gas film to support the rotor assembly of a turbomachine, and flexibly mounted bearing pads to sustain the dynamic loading experienced by the bearing assembly during operation of the turbomachine. Further, the systems and methods described herein provide damper assemblies suitable for use in non-oil lubricated bearing assemblies and turbomachinery, as well as other oil-free operating environments. The embodiments described herein facilitate incorporating fluid-based damping assemblies into oil-free environments, and enhancing the damping capacity of such damping assemblies to levels approaching the damping capacities of oil-based squeeze-film dampers. More specifically, the systems and methods described herein utilize a hermetically sealed fluid-filled damper housing having a closed flow circuit, in combination with integrally formed springs. Therefore, the damper assemblies described herein have damping capacities suitable for use in full-scale turbomachines, yet do not require complex flow circuits or sealing assemblies.

An exemplary technical effect of the systems and methods described herein includes at least one of: (a) reducing the rotary-resistance of journal bearing assemblies used to support rotor assemblies in non-oil lubricated turbomachinery; (b) enhancing the wear-resistance of such journal bearing assemblies; (c) enhancing the damping capacity of such journal bearing assemblies; (d) enhancing the static load capacity of such journal bearing assemblies; and (e) increasing the damping capacity of damper assemblies suitable for use in oil-free environments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A journal bearing assembly comprising:
   a bearing housing comprising a radial outer wall;
   a plurality of bearing pads mounted within said bearing housing, said bearing pads comprising at least one of a gas permeable porous media and an array of gas delivery holes; and
   a plurality of bearing pad support assemblies radially interposed between said bearing pads and said radial outer wall, each said bearing pad support assembly comprising:
   a spring assembly; and
   a damper assembly comprising a hermetically sealed fluid-filled damper, wherein the hermetically sealed fluid-filled damper comprises:
      a sealed damper housing comprising a body having a cavity and a resistive flow path defined therein, the cavity and the resistive flow path being filled with a viscous fluid;
      a plunger disposed within the cavity, said plunger separating the cavity into a first control volume and a second control volume, wherein the resistive flow path provides fluid communication between the first and second control volumes; and
      a load transferring member coupled to said plunger, said load transferring member configured to transmit mechanical loads imparted on said bearing pads to said plunger.

2. The bearing assembly in accordance with claim 1, wherein at least one of said spring assemblies comprises two springs integrally formed with said bearing housing, said springs having an "S"-shaped cross-section.

3. The bearing assembly in accordance with claim 1, wherein said bearing housing comprises a radial inner wall adapted to receive said bearing pads such that said radial inner wall is interposed between said bearing pads and said damper assemblies, said radial inner wall configured to transmit mechanical loads from said bearing pads to said bearing pad support assemblies.

4. The bearing assembly in accordance with claim 3, wherein said bearing housing comprises a plurality of gas delivery ports extending from said radial outer wall towards said radial inner wall, each said gas delivery port in fluid communication with a bearing pad.

5. The bearing assembly in accordance with claim 1, wherein at least one of said bearing pads is fabricated from carbon graphite.

6. The bearing assembly in accordance with claim 1, wherein said plurality of bearing pads define an annular inner bearing surface configured to support a rotatable shaft.

7. A turbomachine comprising:
   a casing defining a process chamber;
   a rotor assembly comprising a rotatable shaft positioned within the process chamber; and
   a journal bearing assembly supporting said shaft, said bearing assembly comprising:
   a bearing housing;
   a plurality of bearing pads mounted within said bearing housing, said bearing pads comprising at least one of a gas permeable porous media and an array of gas delivery holes; and
   a plurality of bearing pad support assemblies radially interposed between said bearing pads and said bearing housing, at least one of said bearing pad support assemblies comprising a damper assembly comprising a hermetically sealed fluid-filled damper assembly, said bearing assembly configured to receive a process gas from the process chamber and transmit the process gas to said bearing pads to provide lubrication between said shaft and said bearing pads, wherein the hermetically sealed fluid-filled damper comprises:

a sealed damper housing comprising a body having a cavity and a resistive flow path defined therein, the cavity and the resistive flow path being filled with a viscous fluid;

a plunger disposed within said cavity, said plunger separating the cavity into a first control volume and a second control volume, wherein the resistive flow path provides fluid communication between the first and second control volumes; and a loading member coupled to said plunger, said loading member configured to transmit mechanical loads imparted on said bearing pads to said plunger.

8. The turbomachine in accordance with claim 7, wherein said turbomachine is a non-oil lubricated turbomachine.

9. The turbomachine in accordance with claim 7, wherein said process gas comprises at least one of compressed air and combustion gases.

10. The turbomachine in accordance with claim 7, wherein said shaft has a mass of at least about 50 pounds.

11. The turbomachine in accordance with claim 7, wherein each of said bearing pad support assemblies further comprises:

a spring assembly.

12. The turbomachine in accordance with claim 11, wherein at least one of said spring assemblies comprises two springs integrally formed with said bearing housing, said springs having an "S"-shaped cross-section.

13. A method of assembling a journal bearing assembly, said method comprising:

providing a bearing housing including a radial inner wall and a radial outer wall;

providing a plurality of bearing pads including at least one of a gas permeable porous media and an array of gas delivery holes;

coupling the plurality of bearing pads along the radial inner wall of the bearing housing;

providing a plurality of bearing pad support assemblies, each of the bearing pad support assemblies including a spring assembly and a damper assembly comprising at least one hermetically sealed fluid-filled damper, wherein the at least one hermetically sealed fluid-filled damper is coupled to a bearing pad such that mechanical loads imparted to the bearing pad are transmitted to the at least one hermetically sealed fluid-filled damper; and coupling the damper assemblies within the bearing housing.

14. The method in accordance with claim 13, further comprising coupling the bearing pads in fluid communication with a pressurized gas source.

15. The method in accordance with claim 13, wherein providing a plurality of bearing pads comprises providing at least one bearing pad fabricated from carbon graphite.

16. The method in accordance with claim 13, wherein providing a plurality of bearing pad support assemblies comprises providing two springs integrally formed with the bearing housing, the springs having an "S"-shaped cross-section.

* * * * *